April 26, 1960  F. A. RUSCIANO ET AL  2,934,330
APPARATUS FOR PRODUCING CONTROLLED FURNACE ATMOSPHERES
Filed April 9, 1953  6 Sheets-Sheet 4

INVENTORS
F.A. RUSCIANO
H.J. NESS
BY
M. J. Reynolds
ATTORNEY

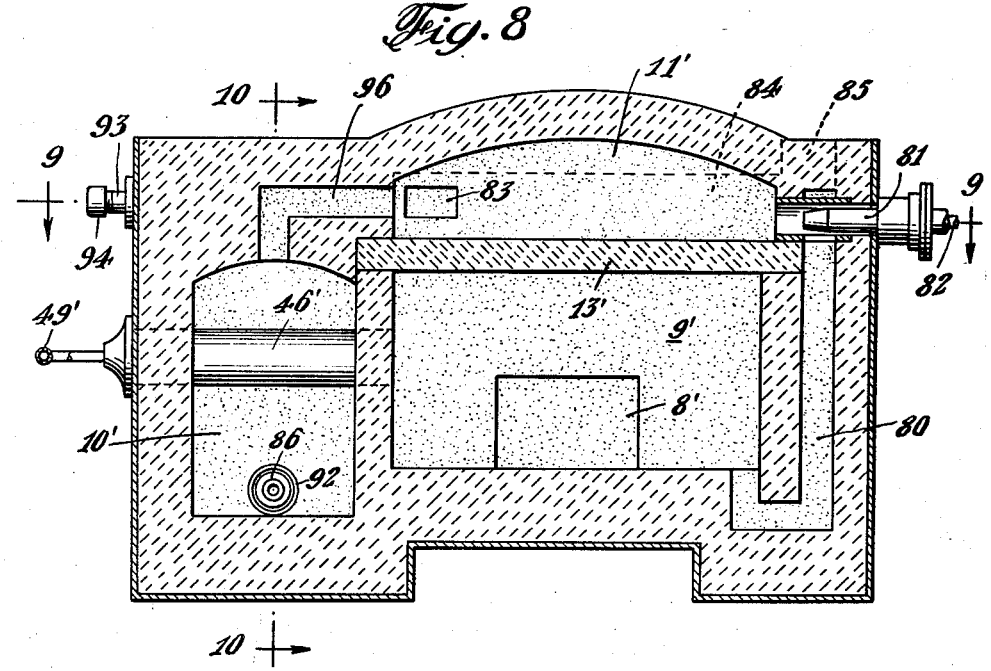
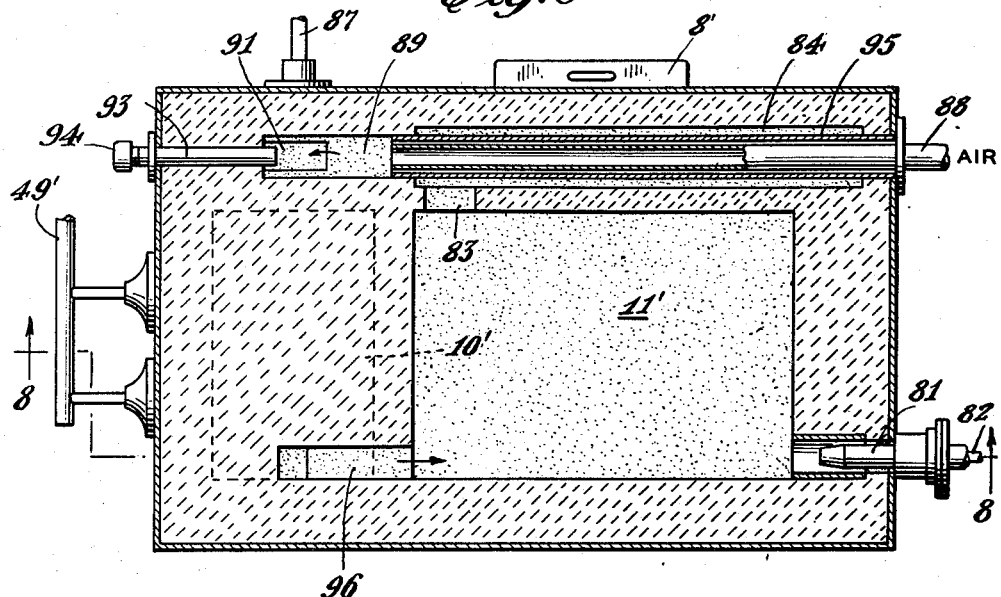

April 26, 1960   F. A. RUSCIANO ET AL   2,934,330
APPARATUS FOR PRODUCING CONTROLLED FURNACE ATMOSPHERES
Filed April 9, 1953   6 Sheets-Sheet 6

INVENTORS
F. A. RUSCIANO
H. J. NESS
BY
ATTORNEY

United States Patent Office 2,934,330
Patented Apr. 26, 1960

2,934,330

APPARATUS FOR PRODUCING CONTROLLED FURNACE ATMOSPHERES

Frank A. Rusciano, New York, N.Y., and Harold J. Ness, Montclair, N.J., assignors to Metallurgical Processes Co., Newark, N.J., a corporation of New Jersey Application April 9, 1953, Serial No. 347,716

12 Claims. (Cl. 266—5)

This invention relates to a method of producing non-oxidizing heating atmospheres for industrial furnaces and to a furnace adapted to be operated in accordance with such method.

The principal object of the invention is to produce a non-oxidizing heating atmosphere for a furnace which may be controlled so as to have any desired ratio of carbon-dioxide to carbon-monoxide at the operating temperature of the furnace.

More specifically, one of the objects is to provide a furnace atmosphere which will be non-oxiding to metals at temperatures within the range from about 1200° F. to 2600° F., although it is to be understood that the invention is applicable to a wider range of temperatures, the upper limit being restricted only by the maximum combustion temperature of the fuel employed and the ability of suitable refractory materials to withstand such temperatures. The range recited above encompasses those temperatures ordinarily encountered in commercial heating and is given by way of example only.

A further object is to provide a furnace atmosphere which will be composed of the reaction products of a hydrocarbon fuel and air produced in the furnace and which may be either neutral or carburizing to steel.

Another object is to produce such an atmosphere which in addition to providing the protection for the work being heated will also supply the heating requirements of the furnace or a substantial portion thereof.

A still further object is to accomplish the above objects in a simple, economical and readily controlled manner.

A further object is to provide a furnace structure by which the aforesaid atmosphere may be obtained.

Other objects and advantages will hereinafter appear.

In accordance with the present invention a mixture of air and fuel in the proper proportion to provide any desired $CO_2/CO$ ratio, which is in equilibrium with the steel at the heating temperature, or at least non-oxidizing to it, is reacted to substantial completion under the stimulus of supplemental heat. This atmosphere in its highly heated state is then employed both as a heating and protective atmosphere for the work being heated in the furnace. Such an atmosphere will, because of its high carbon monoxide and hydrogen content, contain a large amount of latent heat and this latent heat is employed both to supply the reaction stimulus to the air-fuel mixture and for adding heat to the furnace chamber, so that the entire heating requirements of the furnace may be obtained from the furnace atmosphere gas. The process is advantageous wherever scale-free heating is required and particularly so where large quantities of furnace atmosphere are employed and where a high temperature and a high heating rate are essential.

The fuel may be either gaseous, liquid or solid, and the quantity of air supplied therewith is related to the ratio of carbon to hydrogen in the fuel, in a manner to produce in the products of reaction thereof, when carried to substantial completion, a ratio of carbon dioxide to carbon monoxide which falls substantially upon or to the reducing side of the recognized equilibrium ratio curves for the carbon dioxide-carbon monoxide reactions in contact with steel, all as will more fully appear hereinafter. When the molecular ratio of carbon to hydrogen in the fuel is low, between .4 and 1.5 as is the case in the majority of commercial heating gases, the amount of air supplied may be determined solely by the composition of the fuel. When the carbon to hydrogen ratio of the fuel is higher, for instance, of the order of 1.5 to 3, it is sometimes desirable to also take into consideration the temperature to be employed in the furnace.

One of the essential requirements of the process is that the air-fuel mixture in proper proportion be reacted to substantial completion and stabilized prior to contact with the work, since any reactions occurring at the work will create a transient oxidizing condition which will produce scale. Reactions of the low oxygen content mixtures herein contemplated can not be completed to this required extent by direct combustion in the furnace chamber and without the addition thereto of supplemental heat. The mixture which must be employed may have a deficiency of air as high as 50%. Such mixtures are at the lower end of the exothermic range where the heat released may be as low as 20% of the total available B.t.u. content of the gas. The combustion of such mixtures if unassisted is slow and incomplete and produces a relatively lazy low temperature flame, insufficient to have the desired heating rate. Much of the fuel will pass through the furnace unreacted, with the presence in the atmospheres of large quantities of uncracked hydrocarbon and unconsumed carbon or soot.

One of the features of the present process resides in the addition of sufficient supplemental heat energy to the mixture or to the products resulting therefrom, for a period which will insure completion of the reactions. This is accomplished immediately prior to introducing the hot products into the work chamber of the furnace and hence prior to contact of the gaseous products with the work. It is preferred to add sufficient heat to the reaction products to raise their temperature up to or above the temperature to which the work is to be heated, not only to prevent chilling the work, but to assist in the heating thereof and, further, to eliminate transient oxidizing effects from occurring in contact with the work. This last consideration will be explained in more detail hereinafter.

Since, as stated, the gaseous atmosphere so produced will have a large deficiency in the amount of oxygen required for complete combustion, it will contain latent heat, which may amount to 80% or more of the available B.t.u. content of the fuel employed. Another feature of the invention is the utilization of this latent heat, by the addition of air to the atmosphere gases after they are vented from the heating chamber, both as the source of supplemental heat energy for the incoming gaseous mixture and as a source of heat for the furnace chamber. Thus the entire B.t.u. content of the fuel, over and above that which is lost through the doors, slots or other work openings, is supplied to the furnace as heat while at the same time enabling a furnace atmosphere to be obtained which will have the desired neutral composition.

The manner in which these and other objectives of the invention are carried out will best be understood by reference to the accompanying drawings, in which:

Fig. 8 is a vertical sectional view of a modified form of furnace structure, taken on the line 8—8 of Fig. 9;

Fig. 9 is a horizontal section taken on the line 9—9 of Fig. 8;

Reference will first be made to the curves of Figs. 5, 6 and 7 in order that the nature of the non-scaling atmosphere, and the considerations necessary to obtain it, may be more fully appreciated.

Figure 5:
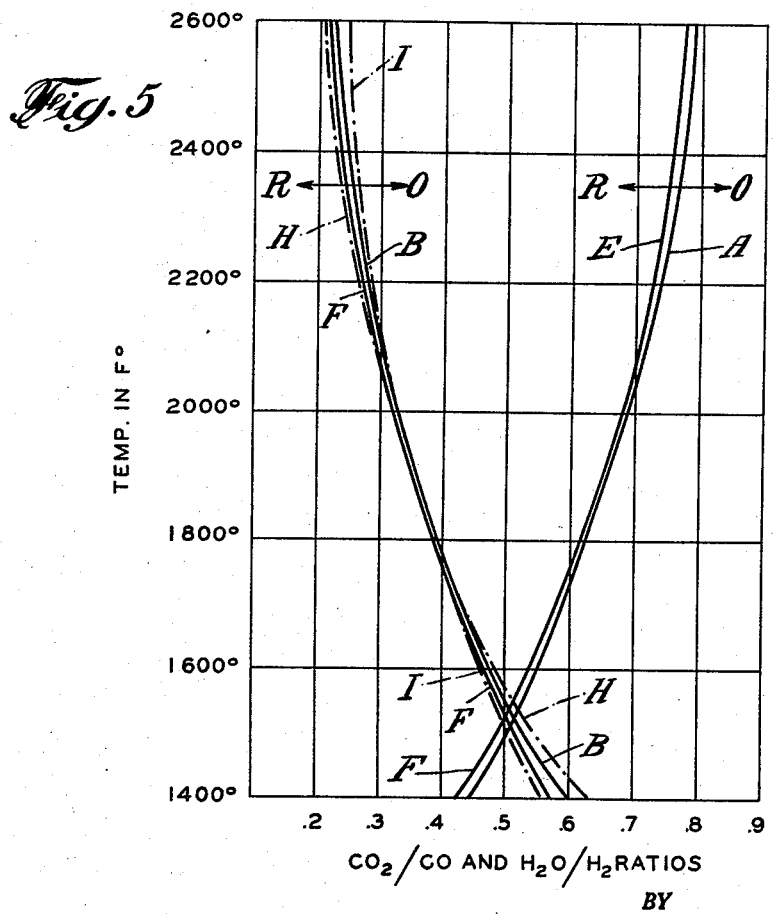
Fig. 5 illustrates curves showing the recognized equilibrium ratios for $H_2O$, $H_2$ and $CO_2$, $CO$ reactions in contact with steel over a range of temperatures.

In Fig. 5 the curves A and B represent, respectively, the recognized equilibrium ratio curves for the water vapor—hydrogen and carbon dioxide—carbon monoxide reactions in contact with steel, the equilibrium ratios in $H_2O/H_2$ and $CO_2/CO$ being plotted against temperature. The particular $H_2O/H_2$ and $CO_2/CO$ ratio prevailing in the heating chamber atmosphere at any particular temperature, if falling to the right of the respective equilibrium curves, will indicate a scaling condition in the furnace, and if to the left, a non-scaling or reducing condition. The purpose of the precent invention is to produce an atmosphere by direct combustion or reaction which will have $H_2O/H_2$ and $CO_2/CO$ ratios falling on or to the left of curves A and B.

While the equilibrium or non-scaling $CO_2/CO$ ratios are discussed herein principally with reference to steel, it should be pointed out that atmospheres which are non-scaling to steel will also be non-oxidizing to other metals, such as copper or brass, and the process and apparatus disclosed are suitable for and intended to be used for the heating of all readily oxidizable metals.

Figure 6:
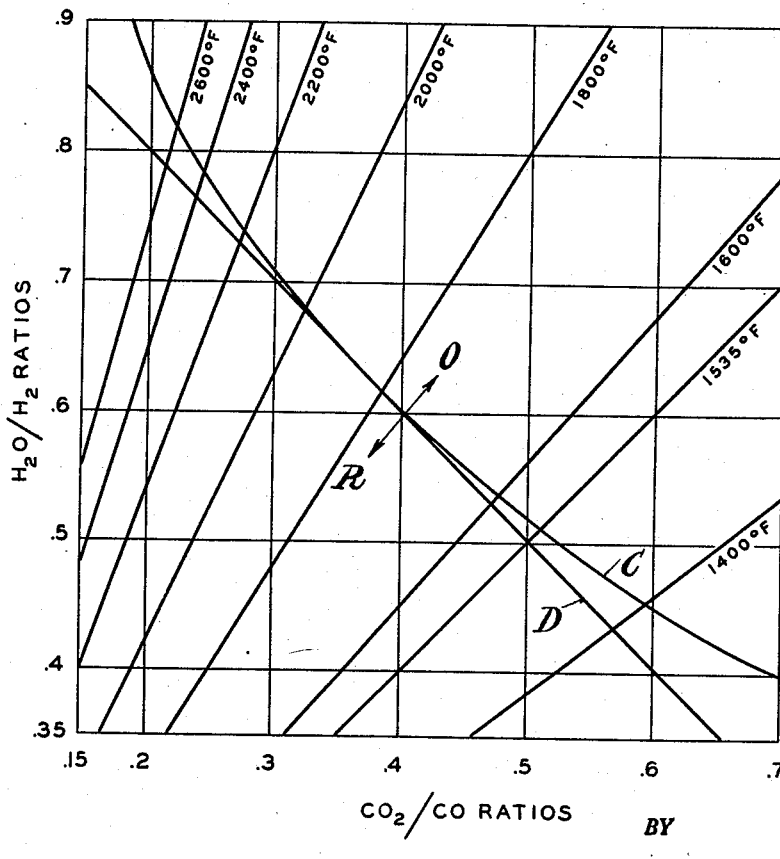
Fig. 6 shows the $CO_2/CO$ and $H_2O/H_2$ relationship inherently existing in a furnace atmosphere at various temperatures and having superimposed thereon the $CO_2/CO$ and $H_2O/H_2$ equilibrium ratio curve.

In Fig. 6 the diagonal lines show the relationship which inherently exists between the $H_2O/H_2$ ratios and the $CO_2/CO$ ratios at different temperatures, in accordance with the reaction $CO+H_2O=CO_2+H_2$, the $CO_2/CO$ ratios appearing as abscissa and the $H_2O/H_2$ ratios as ordinates. From these curves it will be apparent that for any given $CO_2/CO$ ratio at a definite temperature there will be a corresponding fixed $H_2O/H_2$ ratio, and as the temperature of the gaseous atmosphere is increased, the $H_2O/H_2$ ratio corresponding to fixed $CO_2/CO$ ratio will increase. Thus at about 1535° F., which in Fig. 6 would be represented by a 45° diagonal, the $CO_2/CO$ ratio and the $H_2O/H_2$ ratio will always be equal, irrespective of the particular hydrocarbon fuel and air mixture employed in producing the gaseous atmosphere. In Fig. 5 this is represented by the point of intersection of the curves A and B.

A fact not generally recognized is that in combustion atmospheres where the combustion is carried to sufficient completion to produce a stable condition in the atmosphere, the $H_2O/H_2$ ratios expressed by curve A are the ratios that inherently accompany the $CO_2/CO$ ratios expressed by curve B at any temperature. Thus curves A and B may be represented by the single curve C in Fig. 6 which again expresses the equilibrium ratios at each temperature.

Since the equilibrium ratios follow the general relationship $$\frac{H_2O}{H_2} = K\frac{CO_2}{CO}$$

where K is a function temperature under the law of mass action, it is sufficient, in determining the scaling or non-scaling nature of a particular atmosphere, only to ascertain the $CO_2/CO$ ratio, since if this ratio is on or to the left of the equilibrium curve B, the $H_2O/H_2$ ratio inherently will also be on or to the left of curve A. This is an important consideration since direct analysis of the carbon dioxide and carbon monoxide content of a gas is much easier and more accurate than a determination of the water vapor content.

Another fact, also not generally appreciated, is that the curves A and B of Fig. 5 represent substantially the changes in the $CO_2/CO$ and $H_2O/H_2$ ratio which inherently occur as the temperature of a gaseous atmosphere of predetermined content is increased. In other words, a gaseous atmosphere produced by the direct combustion or reaction of an air-fuel mixture in which the ratio of carbon to hydrogen is 0.75 and in which the amount of oxygen present is just sufficient to produce a $CO_2/CO$ ratio falling on curve B at any specified temperature will, as the temperature is increased, produce $CO_2/CO$ ratios which follow curve B. The $H_2O/H_2$ ratios will also inherently follow curve A. The foregoing is substantially true for all fuels having a carbon to hydrogen ratio between about 0.4 to 1.5 or slightly higher. This range includes substantially all of the commercial fuels. Thus with each such fuel there is one air-fuel ratio which, for all practical purposes, will produce an atmosphere in equilibrium with the metal at all furnace temperatures. Therefore, within the limits specified, the non-scaling nature of the atmosphere may be determined by accurate proportioning of the air-fuel mixture, and with such properly proportioned mixture the resulting atmosphere will remain non-scaling, not only at furnace temperature, but while the work is being brought up to heat.

The amount of air required to obtain this equilibrium condition in the furnace will vary, of course, with the fuel employed, but with all fuels falling within the range specified, it will constitute from about 50% to 60% of the oxygen required for complete combustion of the particular fuel employed.

With pure methane ($CH_4$) this corresponds to an air-gas ratio of about 5 to 1; with ethane ($C_2H_6$) a ratio of 8.9 to 1; with propane ($C_3H_8$) a ratio of 12.8 to 1; and with butane ($C_4H_{10}$) a ratio of 16.8 to 1. With gases such as natural gas, city gas, and the like, the oxygen required for an equilibrium condition will vary with the composition of the gas but will fall within the specified range of about 50% to 60% of the oxygen required for complete combustion, including that oxygen which is contained in the fuel in either free or combined form. However, in order to insure that the $CO_2/CO$ ratio of the resulting gaseous atmosphere will be definitely to the left of curve B of Fig. 5 and to compensate for slight air leakage into the furnace, it is preferred generally to employ a quantity of air which is somewhat less than the theoretical amount required to produce the equilibrium condition.

Referring again to Fig. 6 in which the $H_2O/H_2$ and $CO_2/CO$ equilibrium ratios derived from Fig. 5 at each temperature are plotted against each other to produce the corresponding equilibrium curve C, it will be noted that this curve is tangent, at approximately 1800° to the 45° diagonal line D representing the condition in which the sum of the $H_2O/H_2$ and $CO_2/CO$ ratios equal unity. The divergence of curve C from line D above and below 1800° is exaggerated in Fig. 6 due to the radiating nature of the temperature lines. However, when expressed in terms of the difference in $H_2O/H_2$ and $CO_2/CO$ ratios, as indicated graphically by replotting line D as curves E and F in Fig. 5, the closeness with which the equilibrium curves A and B correspond to the unity summation will be evident. Thus the equilibrium condition may be stated, for all practical purposes, as existing when the sum of the $H_2O/H_2$ and $CO_2/CO$ ratios equals unity. This is irrespective of the gas employed. The amount of oxygen required to produce this unity summation will vary with the carbon and hydrogen content of the fuel, as previously stated.

Figure 7:
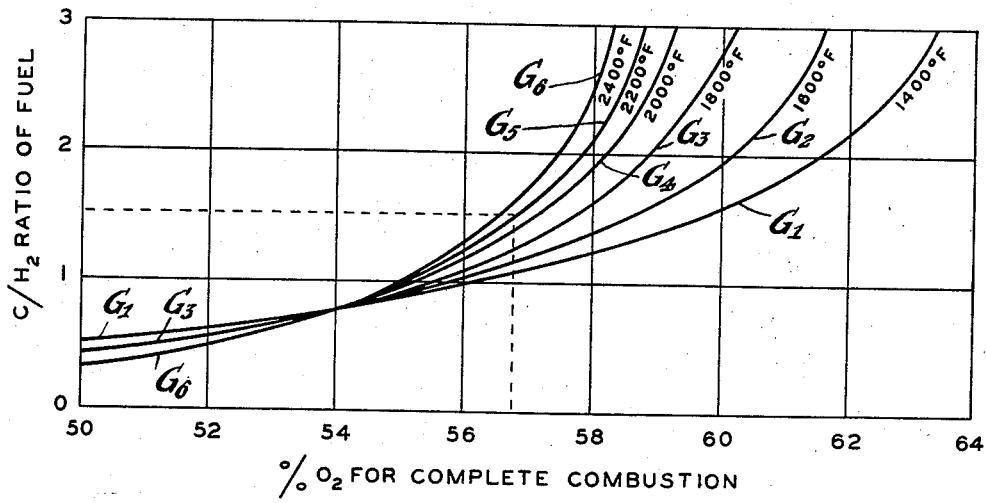
Fig. 7 shows the relationship between the oxygen required to establish an equilibrium condition in the furnace atmosphere at different temperatures, with fuels having different carbon to hydrogen ratios.

In Fig. 7 a family of curves G1 to G6 is shown which represent the amount of oxygen, expressed in percentage of that required for complete combustion, needed to produce the equilibrium ratios expressed by curves A and B of Fig. 5 at different temperatures, and with different ratios of carbon and hydrogen in the fuel. It will be noted that these curves radiate from or pass through a common point corresponding to a $C/H_2$ ratio of 0.75 and an oxygen content of 54%. Thus a gas, such as propane ($C_3H_8$), which has a $C/H_2$ ratio of .75, when mixed with 54% of the oxygen required for complete combustion will produce, on complete reaction, an atmosphere which is in equilibrium with steel at all temperatures. As the $C/H_2$ ratio of the fuel increases or decreases from the value of 0.75, the curves G1 to G6 diverge indicating that the amount of oxygen required to produce $CO_2/CO$ ratios falling exactly on the equilibrium curve B must be adjusted to the temperature desired in the furnace. The divergence of the curves in the range between $C/H_2=0.4$ and 1.5 is slight, however, and for practical purposes all fuels coming within this range may be considered as remaining in equilibrium at all temperatures when reacted with a fixed quantity of oxygen. In Fig. 5 curves H and I show the extent to which the $CO_2/CO$ ratios of 0.5 and 1.0 respectively deviate from the equilibrium curve B with changes in temperature. Curve H represents a fuel, such as methane ($CH_4$) having $C/H_2$ ratio of 0.5 reacted with 50.5% of the air required for complete combustion, and curve I represents a fuel, such as ethylene ($C_2H_4$), propylene ($C_3H_6$) or butylene ($C_4H_8$), having a $C/H_2$ ratio of 1.0 admixed with 55.5% of the air required for complete combustion. The concurrence of curves H and I with curve B is sufficiently close to be considered coincident therewith for practical purposes. Above the 1.5 $C/H_2$ ratio the temperature curves of Fig. 7 diverge more rapidly, thus requiring a greater percentage of oxygen to produce the equilibrium ratios as lower temperatures are employed. However, if an oxygen percentage is selected which will produce an equilibrium atmosphere at the maxium temperature to be employed, such an atmosphere will be to the left or on the reducing side at all lower temperatures. Thus, if a fuel such as #6 petroleum oil, which has a $C/H_2$ ratio of about 1.5, is to be employed for heating up to 2200° F., an oxygen content of about 56.8% is indicated by the curve G5 of Fig. 7. With this mixture the atmosphere produced when the reactions are stabilized will be in equilibrium with steel at 2200° F. and slightly reducing or non-scaling at all lower temperatures.

All of the above considerations are based upon the assumption that the reaction of the fuel and air is complete. If the fuel is not completely cracked down and fully reacted with the meager supply of air, and these reactions stabilized before the reaction products come into contact with the work, oxidizing conditions will prevail even though the proper air-gas ratio is supplied to the furnace. This is evident, since any free carbon or uncracked hydrocarbons which pass through the furnace or otherwise fail to acquire their full share of oxygen have the effect of increasing the air-gas ratio of the remaining reacted fuel. However, as stated, air-gas ratios of the low order here contemplated will not attain a completely reacted and stabilized state by themselves since both the rate of combustion and the flame temperature are too low. An air-gas mixture which will produce, on complete reaction, a combined $H_2O/H_2$ and $CO_2/CO$ ratio of one, that is, a mixture containing from 40% to 50% deficiency of air, depending on the nature of the fuel, will produce by unassisted combustion only a small residual of heat over that absorbed by the fuel in the reaction process. Since the cracking or reaction rate is a function of time and temperature and since there is little available heat for this purpose, the reaction time is accordingly prolonged. The resulting products, therefore, will contain comparatively large amounts of hydrocarbon and free carbon or soot and the equilibrium ratios of $CO_2/CO$ and $H_2O/H_2$ will not be obtained or even closely approached. This difficulty is overcome in the present invention by assisting the reaction in such a way as to insure the complete reaction and stabilization of the air and fuel before it can come into contact with the work. The manner in which this is done will best be understood by reference to Figs. 1 to 4 which will now be described.

In these figures the furnace structure shown comprises a main work heating chamber 9, a pair of symmetrically disposed combustion chambers 10 at each side of the main chamber 9, and a combustion chamber 11 disposed above the heating chamber 9. The function of the chambers 10 is to supply heat to the chamber 9 by conduction and radiation and to the air-gas mixture entering chamber 9 to effect reactions between the constituents thereof in order to produce a protective or treating atmosphere for use in the main or work heating chamber. The two chambers 10 and their associated parts are identical and in the following description these chambers will be referred to in the singular and common reference numerals employed for the corresponding parts of both chambers.

The work heating chamber 9 is defined by the floor 12, arched roof 13, front vertical wall 14 having a work loading opening 7, closed by a door 8, opposed rear wall 15 and opposite similar side walls 16, 16', all composed of refractory brick work. Each supplemental chamber 10 is defined by the floor 17, arched roof 18, front and rear vertical walls 14', 15', formed as extensions of the walls 14 and 15, external side wall 19 and the wall 16 or 16' which separates chamber 9 from chambers 10.

Chamber 11 is formed between the arch 13, an arch 21, and the furnace front and side walls. It is coextensive with the arch 13, that is, it extends over the entire heating chamber 9.

Figure 1:
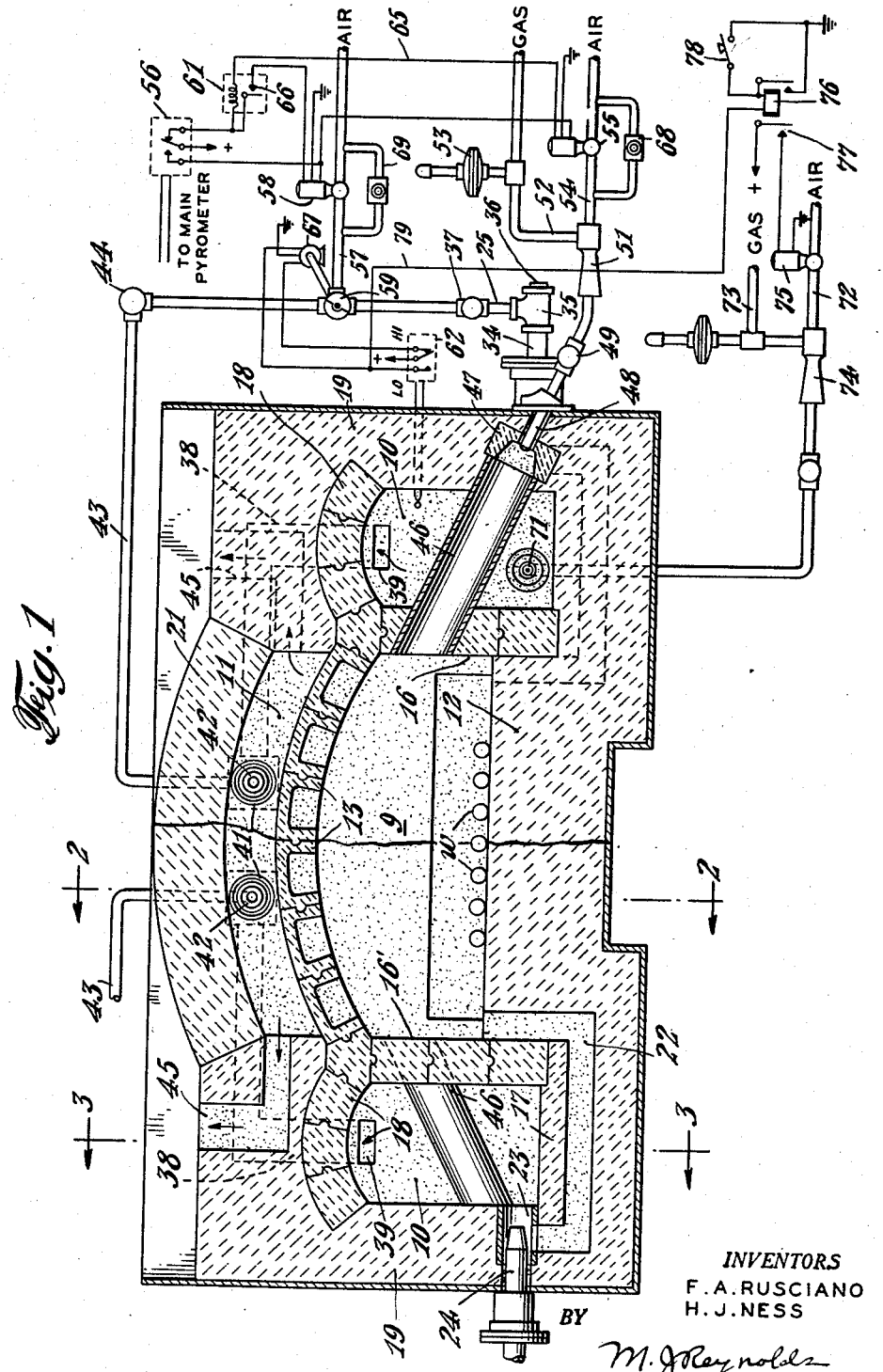
Fig. 1 is a vertical sectional view of one form of furnace embodying the present invention, the right half being a central section taken on the line 1A—1A of Fig. 2, and the left half, which is symmetrical therewith, being taken on the line 1B—1B of Fig. 2.
Figure 2:
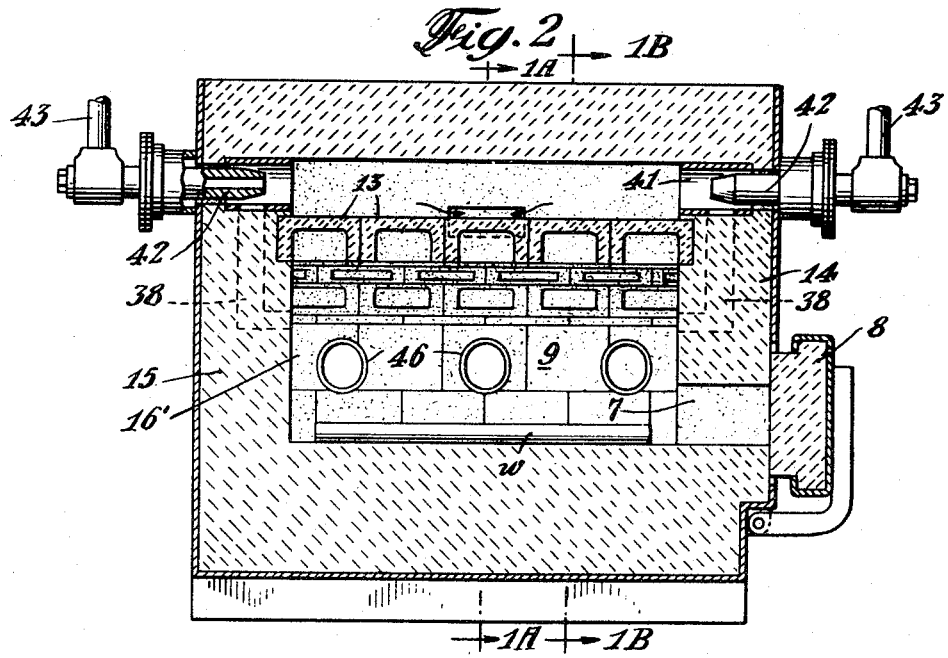
Fig. 2 is a transverse vertical section of the work chamber of the furnace taken on the line 2—2 of Fig. 1.
Figure 3:
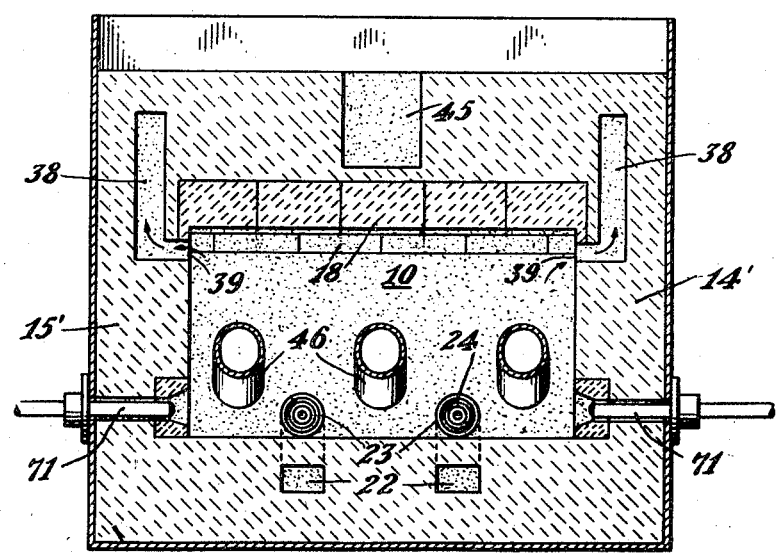
Fig. 3 is a transverse vertical section of the atmosphere generating chamber of the furnace taken on the line 3—3 of Fig. 1.
Figure 4:
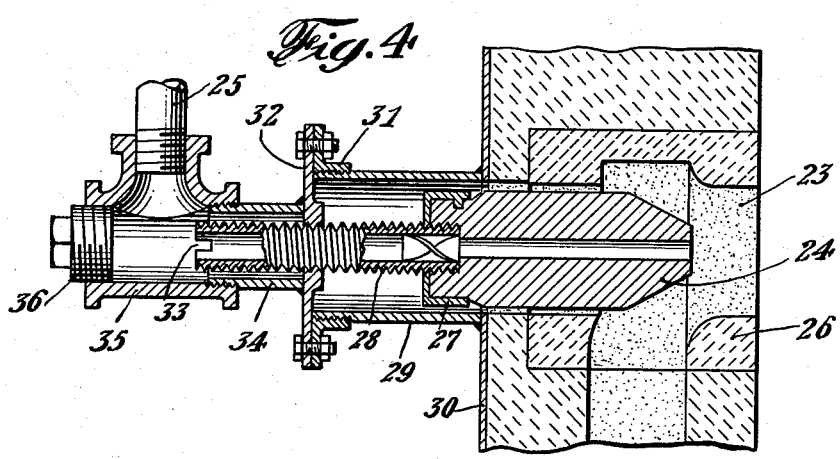
Fig. 4 is a detail sectional view of one of the supplemental air inlet nozzles.

As previously explained, the gaseous atmosphere used in the chamber 9 to surround the work is very high in carbon monoxide and hydrogen, and has a potential B.t.u. content which may be up to 80% of the heat content of the fuel employed. This gas serves as the fuel for combustion in the chambers 10 and 11, being vented from the chamber 9 through passageways, such as 22, extending through the floors 12 and 17 and connecting with the chambers 10 by ports 23. Supplemental air to support the combustion of this fuel is supplied by a nozzle 24, from a conduit 25. The nozzle 24 has a conical outer surface which may be adjusted relative to the port 23, so as to regulate the effective port area. Referring to Fig. 4, the nozzle 24, which is composed of a high temperature refractory, such as silicon carbide, extends into a refractory block 26 of similar material, forming the outlet port 23. The nozzle is carried by an alloy metal cup 27 welded to an externally threaded pipe 28. A tube 29, welded to the shell 30 of the furnace, carries a pipe flange 31 to which a plate 32 is bolted. The plate 32 has a central aperture in threaded engagement with the pipe 28, and the pipe 28 is slotted at 33 to receive a tool for turning the pipe to adjust the nozzle 24 relative to the port in block 26. The outer end of the pipe 28 is enclosed in a tube 34 welded at one end to plate 32 and having a T connection 35 at the opposite end, with the air conduit 25. A removable plug 36 permits access to the pipe 28 for the adjustment thereof. The supplemental air is supplied to the conduit 25 by a manifold 37, under a predetermined pressure, and the nozzle and port act similarly to a proportional venturi mixing device to draw in under suction a controlled quantity of gas from chamber 9, the amount depending upon the rate of flow of air through the nozzle and the adjusted effective port area.

The amount of air supplied by the nozzles 24 may be sufficient to effect complete combustion of the atmosphere gas or a somewhat lesser amount, depending upon the temperature which it is desired to maintain in the chambers 10. The chambers 10, in turn, are vented through passageways, such as 38, extending from ports 39 at each end of the chambers 10 to ports 41 disposed at the corresponding ends of combustion chamber 11. The ports 41 are also provided with air inlet nozzles 42 supplied, when desired, with air from conduits 43 from a manifold 44. The aggregate amount of air supplied by nozzles 24 and 42 is that which is required to provide complete combustion of the atmosphere gas. Chamber 11 is vented to the outside of the furnace through flues, such as 45, disposed centrally of the opposite sides of the chamber.

The purpose of chamber 11 and in part of chambers 10 is to impart heat to the work chamber 9 and, in order to facilitate the transfer of heat thereto, the walls 16, 16' and arch 13 are composed of relatively thin sections of a high temperature and high heat conducting refractory, such as silicon carbide. As shown, these walls are constructed of interlocking bricks, the arch bricks being recessed to decrease the wall thickness and increase the radiating area, although slab construction may also be employed.

As heretofore stated, the purpose of the invention is to provide a gaseous atmosphere for the work chamber 9 which will have any desired composition from one which is merely neutral or non-scaling to the work at the particular operating temperature, to one which is of an even richer or carburizing nature, and to obtain such atmospheres at any desired temperature, and further, at a fast heating rate and a minimum of fuel consumption.

The desired composition of the furnace atmosphere is obtained by the controlled combustion or reaction of the proper air-fuel mixture, as heretofore described, aided by the heat developed by the secondary combustion produced in chambers 10, as will subsequently appear. The high heating rate is obtained by utilizing both the heat produced by such controlled combustion and the heat imparted to the reaction products by the chambers 10 in the course of such reaction, together with that developed in the combustion chambers 10 and 11 and imparted to the heating chamber 9 through the walls 16, 16' and 13. The heating rate is enhanced by the exceptionally high combustion temperatures produced in the chambers 10 and 11, the contributing factors of which are the supplying of the furnace atmosphere gas to these chambers in a fully cracked and high temperature condition, that is, directly from and substantially at the temperature of the furnace chamber, whereby very rapid combustion occurs in the absence of the normal combustion retarding and heat consuming effects of heating the fuel up to ignition temperature and cracking it down, this cracking having previously been accomplished, as will be described, when the fuel was first supplied to the work chamber 9. Since the reaction temperatures are dependent on the rate of combustion and the thermal losses incident to such combustion, it will be evident that unusually high reaction temperatures are attained.

The obtaining of the requisite protective or treating atmosphere in the work chamber 9 and the desired heating rate and temperature in the most economical manner is accomplished first by creating the furnace atmosphere directly from a commercial fuel as a part of the furnace heating operation in such a manner that the heat utilized or generated in producing the atmosphere is also employed in heating the furnace, and secondly by using the latent heat in the inherently rich atmosphere so produced for further heating of the furnace. Since the amount of fuel required for heating the furnace is, in general, always sufficient to furnish the atmosphere, and since the heating efficiency of the furnace is equal to or closely approaches that of a direct fired furnace operating with a highly oxidizing atmosphere, it is evident that there is substantially no additional operating cost involved in providing the protective atmosphere.

The atmosphere gas for the work chamber is produced in a series of refractory tubes 46 extending through the chambers 10 at an upwardly inclined angle so as to discharge against the underside of the arch 13. Each tube abuts against a burner block 47 through which a burner or inlet nozzle 48 extends for conducting the desired air-gas mixture to the tubes, the nozzles 48 at each side of the furnace being supplied with the mixture from a manifold 49, in turn supplied by a proportional flow mixer 51 having a gas inlet 52, including a zero pressure regulator 53 and an air inlet 54 containing an electric valve 55. Valve 55 is controlled by a high-low regulator 56 from a pyrometer (not shown) in chamber 9.

The supplemental air for use in chambers 10 and 11 is supplied to the manifolds 37 and 44 from an air supply conduit 57 through an electric valve 58 and a proportioning valve 59. Valve 58 is also controlled from the high-low regulator 56 and is actuated to the high position through a time delay switch 61 so as to operate to this position subsequent to the corresponding actuation of valve 55, for a reason which will hereinafter appear. Valve 59 is motor-operated through the contacts of high-low regulator 62 controlled by a pyrometer in chamber 10 and serves to divide the total amount of air admitted by valve 58, in such manner as to maintain chamber 10 at a predetermined temperature.

In the production of a neutral atmosphere in work chamber 9, the ratio of air and gas supplied to the nozzles or burners 48 will be so proportioned that the resulting products issuing from the tubes 46 in their fully reacted condition will have a composition which, at the operating temperature of the furnace, will not be oxidizing to the metal being heated.

As stated heretofore, the equilibrium condition may be determined by the air-gas ratio supplied to the furnace; the $CO_2/CO$ ratio of the atmosphere gases, or the sum of the $CO_2/CO$ and $H_2O/H_2$ ratios of the atmosphere. If expressed in terms of the air-gas ratio, it is necessary to take into account the ratio of carbon to hydrogen in the fuel, as shown in the curves of Fig. 7. If determined by the sum of the $H_2O/H_2$ and $CO_2/CO$ ratio, any summation over unity indicates a scaling condition, and any summation which is less than unity indicates a reducing condition. Determination by the $CO_2/CO$ ratio alone requires reference to the equilibrium curve B of Fig. 5, although for practical purposes the portion of this curve in the heating range between about 1800° and 2600° may be considered as a straight line. From an inspection of curve B it will be seen that the $CO_2/CO$ ratio at 2100° F. is about 0.3, this ratio increasing or decreasing by about 0.02 per 100° F. at temperatures respectively below and above this temperature. Therefore, $0.3 \mp .02$ per 100° F. above and below 2100° F. may be taken as a sufficiently accurate equilibrium value for the $CO_2/CO$ ratio at operating temperatures within this range.

The production of the low $CO_2$ and high $CO$ content gas necessary to obtain these low $CO_2/CO$ ratios is not consistent with the development of appreciable heat, only about 20% of the B.t.u. value of the fuel being liberated, even assuming the reactions are carried to completion. Actually, with the large deficiency of air, the reaction, if unassisted, will not be completed, the desired $CO_2/CO$ ratio will not be obtained, and only a portion of the theoretical 20% B.t.u. liberation will be accomplished. If a lower air-gas ratio is employed in an attempt to obtain the desired $CO_2/CO$ ratio, the difficulty is aggravated since less heat is produced, and the reactions are further slowed down and are therefore less complete. With the addition of supplemental heat, however, not only may the equilibrium air-fuel ratios be reacted to completion and the full heat of reaction obtained therefrom, but even lower air-gas ratios may be reacted substantially to completion. Thus gaseous atmospheres may be produced having $CO_2/CO$ ratios extending into the carburizing range.

It is highly desirable that the reactions be completed and stabilized prior to contact with the work, and for this reason it is contemplated that the tubes 46 be of sufficient capacity and that sufficient heat will be supplied thereto from the chambers 10 to insure completion of the reactions in the tubes. Furthermore, it is desirable that these reactions be stabilized in the tubes 46 at a temperature equal to or higher than the temperature prevailing in the heating chamber 9, since as heretofore indicated, the $CO_2/CO$ and $H_2O/H_2$ ratios prevailing in the atmosphere continuously readjust themselves to correspond to changes in the temperature thereof in accordance with the reaction $CO_2 + H_2 \rightleftharpoons CO + H_2O$, the reaction being to the right for increases in temperature and to the left for a decrease in temperature. If the air-fuel ratio is proportioned to produce an equilibrium condition in the furnace at the operating temperature thereof, say to produce a $CO_2/CO$ ratio of 0.3 at 2100° F. and if the reaction products are introduced into the chamber 9 at 1800° F., the reaction products will have a $CO_2/CO$ ratio of approximately .36 which is scaling to metal at 2100° F. On the other hand, if these same gaseous products are stabilized in the tubes 46 at higher than furnace temperature, say at about 2400° F., they will have a $CO_2/CO$ ratio of about .24 on entering the heating chamber, this ratio being well to the left or to the reducing side to metal at 2100° F. Solely for the purpose of stabilizing the gases it would be sufficient to add only enough heat energy to raise the temperature thereof to the furnace operating temperature. However, other considerations indicate the advantages of more highly heating the entering gases. The complete reaction of the gases, being a function of both time and temperature, increase in temperature results in a faster completion of the reactions. The reaction may be further accelerated by coating or lining the tubes 46 with a catalytic material, such as nickel chromate or formate. These features enable the use of a smaller reaction tube 46 and chamber 10, thus contributing to a decrease in furnace construction cost and heat radiation loss. The hotter incoming atmosphere also serves as a more effective heat transfer agent between chambers 10 and 9 and serves to increase the temperature and heating rate of the work chamber, thus reducing the heat transfer requirement of the walls 16 and 13. In this connection it will be noted that, due to the location of the vents 22 at the base of the heating chamber 9, the hot atmosphere gas is directed over the work in a manner to envelope the same and assist in the heating thereof. In furnaces where temperatures of 2300° F. to 2400° F. are required, it is preferred to heat the incoming atmosphere up to around 3000° F. or higher. By this means it is possible to obtain furnace temperatures, heating rates and efficiency with a non-scaling atmosphere, which are substantially equal to a direct fired furnace operating with a highly oxidizing atmosphere.

It will be appreciated that the reaction temperature in the tubes 46 should be maintained substantially the same both when the furnace is operating at high fuel demand or under low fuel demand. It is also desirable that a somewhat uniform positive pressure be maintained in the work chamber under both conditions. When the furnace is calling for heat, the high-low regulator 56 will be on its right hand contact and a circuit will be completed from battery at the regulator tongue through the coil of the time delay switch 61 and conductor 65 to the electric valve 55, which thus being fully opened will supply the maximum amount of air to the mixer 51, to thereby induce the proper amount of gas to produce the desired neutral atmosphere. The mixer 51 is adjustable, as is well understood, to obtain the desired proportion of air to gas. At this time the electric valve 58 will also be energized, through the contact 66 of timer 61, to supply supplemental air to the mixing valve 59 and hence to the manifolds 44 and 37. The aggregate amount of air supplied by valves 55 and 58 is just sufficient for the complete combustion of the fuel. Thus, if a fuel such as propane is employed, valve 55 may supply 54% (the equilibrium proportion) and valve 58 will supply the remainder, or 46%, of the air. The proportion valve 59 is operated by a motor 67 which oscillates forward and backward in accordance with the reversals in position of the regulator 52 in response to the temperature in chamber 10. Hence the air supplied by valve 58 is distributed between manifolds 37 and 44 in accordance with the heat requirements of the chamber 10. Accordingly, chamber 10 will be maintained at a substantially fixed temperature, and the combustion which is only partially completed therein will receive the air required for its complete combustion in the arch chamber 11.

When the chamber 9 is at full heat and calls for a reduction in the gas supply thereto, the regulator 56 will go to its left or low position, closing both valves 55 and 58. By-passes 68 and 69 around these valves maintain a reduced supply of air to the nozzles 48, 24 and 42, that supplied through these by-passes being maintained in the same proportion as through valves 55 and 58, that is, in the example given of 54% and 46%. When the furnace later calls for heat, the regulator 56 again moves to its "high" position, reopening air valve 55 to restore the full supply of air and gas to the tubes 46. It is desirable, however, to permit the pressure in the chamber 9 to build up somewhat before increasing the air supply to the nozzles 24 since, if an increased air flow was supplied to these nozzles before the increased flow was established in the chamber 9, nozzles 24 might produce a momentary negative pressure in the chamber which would draw in undesired oxygen through or around the door. Therefore, the timer 61 is so arranged that operation of the timer contacts to open valve 58 occurs a predetermined time after the circuit to valve 55 is completed. The amount of air and gas supplied to the tubes 46 when the furnace is on control will be sufficient to maintain a positive pressure in the chamber 9 but insufficient to supply the heat requirements of the furnace. One of the functions of the nozzle 24 is to control, by the suction produced at the orifice 23, a flow of the atmosphere gas from chamber 9 which will be in such proportion to the atmosphere gas supplied to the chamber 9 both when the furnace is off and on control, that a slight positive pressure will be maintained in the chamber at all times. The adjustment of the nozzle to or from the orifice permits the rate of withdrawal of the atmosphere gas from chamber 9 to be controlled independently of natural flue draft conditions.

In addition to the air and gas supply previously described, a separate burner 71 is provided in the base of each of the chambers 10, this burner being supplied with a combustible air-gas mixture from the air and gas lines 72 and 73, respectively, and venturi mixing valve 74. The air supply is controlled by a solenoid valve 75 controlled by a relay 76 through its left contact 77. The purpose of the burners 71 is to bring the chamber up to heat quickly upon starting up of the furnace. For this purpose the relay 76 is arranged to be operated by the momentary closing of manual switch 78, the circuit extending from battery, through the "low" contact of regulator 62, conductor 79, winding of the relay and switch 78 to ground. The relay on operating locks up through its right armature and make contact. When chamber 10 attains the temperature desired for reacting the mixture in the tube 46, regulator 62 interrupts the circuit to relay 76, which on release interrupts the locking circuit and deenergizes valve 75.

Figure 10:
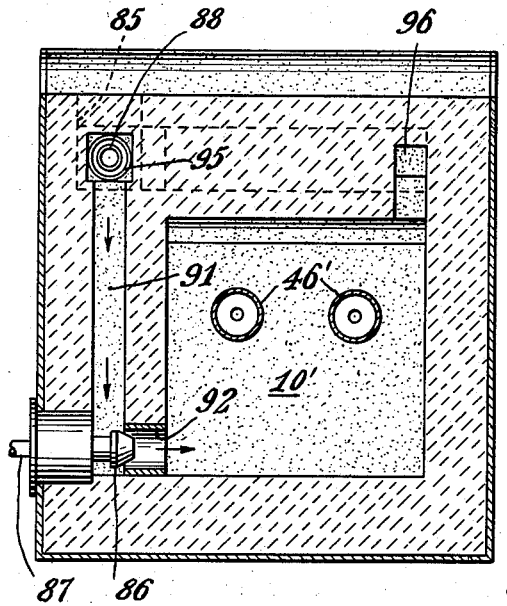
Fig. 10 is a transverse section taken on the line 10—10 of Fig. 8.

In Figs. 8, 9 and 10 a modified furnace structure is disclosed suitable for use in the practice of the present process. It comprises a main heating chamber 9', one side chamber 10' and an arch chamber 11', similar to the furnace of Figs. 1 to 3, with the exception that the chambers 9' and 11' are separated by a thin slab 13' in place of the fabricated arch. A pair of reaction tubes 46' passing through chamber 10' and discharging into the chamber 9', are supplied by manifold 49' with a mixture of air and gas in the proportions to produce a non-oxidizing atmosphere in the heating chamber, as previously described. However, the furnace of these figures is assumed to be of the batch type in which the door 8' is opened only for loading and unloading of the heating chamber, so that a reduced flow of atmosphere gas through the chamber 9' may be employed, which is insufficient to provide the full heating requirements of the furnace.

The furnace atmosphere gas is vented from the chamber 9' through a passageway 80 extending to the chamber 11', supplemental air being supplied thereto by a nozzle 81 from a conduit 82, it being understood that the aggregate amount of air supplied with the fuel through manifold 49' and through the nozzle 81 is substantially that required for the complete combustion of the fuel.

The heat produced by combustion in the arch chamber 11' is in part transferred to the chamber 9' through the thin slab 13', and the products of this combustion are vented from chamber 11' through a port 83 communicating with a passageway 84 extending across the front of the furnace and exhausting to the outer atmosphere through the vertical flue 85.

The chamber 10' is provided with a supply of fuel, independently of the atmosphere gas in chamber 9', by a nozzle 86 supplied by a conduit 87 in such amount as to properly augment the heat suplied by the atmosphere gas entered through the reaction tubes 46' to maintain the heating chamber at the desired temperature. Air is supplied to the chamber 10' for combustion with this fuel by a conduit 88 which passes through the vent passageway 84 and extends into a passageway 89 having a vertical extension 91 terminating at the port 92 about the nozzle 86. A pipe 93 extends into the passageway 89 from the exterior of the furnace and is closed by a cap 94. The conduit 88 is preferably composed of a heat resisting alloy, and for further protection from impingement of the hot oxidizing exhaust gases it is shown surrounded by a high temperature ceramic tube 95 of Alundum, zirconia, or similar material. The tube 95 is shown seated in recesses in the refractory brickwork of the furnace. A coating of such refractory material applied to the outer surface of the conduit 88 may be used in place of the tube 95.

The conduit 88 serves to transfer a part of the heat of the exhaust gases to the incoming air and thus to increase the efficiency of the furnace. It also increases the flame temperature in chamber 10' so that a high reaction temperature may be produced in the tubes 46' with a relatively small supply of fuel through the fuel nozzle 86. This is an important consideration when the extra heat required over that supplied by the furnace atmosphere gas is small.

The chamber 10' is vented through a passageway 96 extending to the arch chamber 11'. It will be understood that since it is desired to heat the tubes 46' and the reaction products flowing therethrough to a temperature above the temperature of chamber 9', as previously discussed, the gases vented from chamber 10' will be above the heating chamber temperature and hence capable of imparting some of their heat to chamber 9' through the slab roof 13'.

It is to be further understood that the air and fuel supplied through conduits 87 and 88 will be in substantially the same proportion to the air-fuel mixture supplied to the tubes 46' by manifold 49' when the furnace is both on and off control. Since the principal heat loss from chamber 10' is to the tubes 46', this will assure substantially uniform reaction temperature in the tubes on both high and low flow. However, in cases where the furnace may be on control for substantial periods, the fuel and air supply for chamber 10' may be adjusted in slightly higher proportion when the furnace is on control to compensate for greater proportionate radiation loss through the walls of the chamber at such times.

Figure 11:
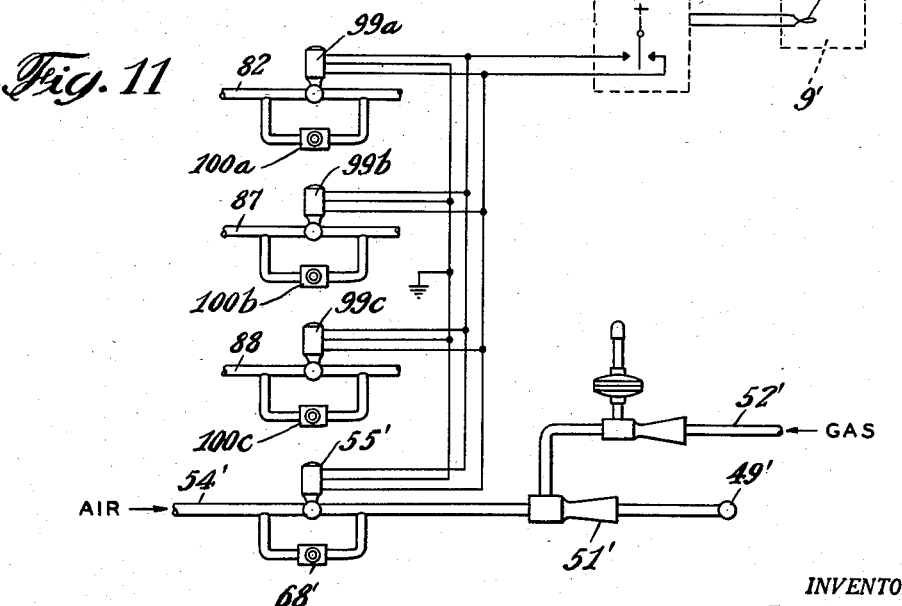
Fig. 11 shows the piping and valving arrangements for the furnace of Figs. 8 to 10.

In Fig. 11 there is shown an arrangement for controlling the air and fuel supply to the conduits 82, 87, 88 and 49' under control of a pyrometer 97 located in the chamber 9' and a temperature regulator 98. Each of the conduits 82, 87 and 88 is provided with electric valves 99a, 99b and 99c, respectively provided with by-passes 100a, 100b and 100c. Manifold 49' is supplied with an air-fuel mixture of equilibrium or neutral atmosphere producing proportions from a venturi mixer 51' by fuel conduit 52' and air conduit 54', the latter being provided with an electric valve 55' and a by-pass 68'. One winding of each of the valves 99a to 99c and 55' is connected to one contact of the temperature regulator, the other contact of which is connected to the opposite winding, whereby all valves are opened or closed simultaneously. When the electric valves are open and properly adjusted, the correct amount of air and fuel will be supplied for full operation of the furnace, as described. When the valves are closed, the flow is reduced as determined by the adjustment of the by-passes.

Figure 12:
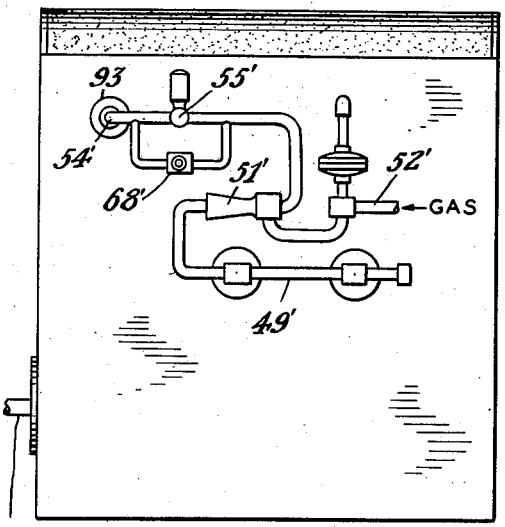
Fig. 12 is a left end view of a modified form of the furnace of Fig. 8.

While, in the furnace of Figs. 8 to 10, the heat regained from the furnace exhaust gases is supplied only to the air supplied to the chamber 10', it is to be understood that the air for nozzle 82 and that supplied to the tubes 46' may likewise be preheated by the exhaust gases as shown in Fig. 12. This preheating of the air may also be employed in the furnace of Figs. 1 to 3 where greater efficiency, a higher temperature, or a faster heating rate is desired.

In Fig. 12 the air pipe 93 shown in Fig. 9 is connected directly to the conduit 54' for supplying heated air to the mixing valve 51' for admixture with the gas from conduit 52' and for supply to the manifold 49' and hence to the tubes 46'. In this form the electric valve 99c is adjusted to supply the air requirements of the tubes 46' and also that required to completely combust the fuel entered through nozzle 86. The electric valve 55' selects from this total supply the particular requirements of the tubes 46'. The form shown in Figs. 8 to 10, in which the heated air is mixed at the point of burning with the fuel from nozzle 86, is suitable for use with highly heated air of 1000° F. or higher, whereas the form of Fig. 12 in which the air and gas are premixed in the valve 54' is suitable for use with somewhat less highly heated air—about 500° F. or less. If it is desired to supply higher temperature air to the tubes 46', the air and fuel gas should be supplied separately and mixed in the tube, in the same manner that air and fuel are supplied to the inlet port 92 of chamber 10'.

The reaction chambers 10 and 10' in the two modifications have been shown as integral parts of the heating furnace. However, if desired, they may be formed as separate units secured to or separated from the work heating furnace, and connected thereto by suitably heat insulated conduits. It will also be evident that the arch chambers 11 or 11' are not essential to the operation of the process but only to the efficiency thereof, and where the recuperative feature of Figs. 8 to 12 is employed, chamber 11' and exhaust vent 84, or an equivalent chamber for preheating of the air might be physically separated from the furnace.

Other modifications of the furnace structure wherein the present process may be carried out will be evident to those skilled in the art.

What is claimed is:

1. A furnace for the heating of metal in a non-scaling atmosphere comprising a metal heating chamber, a reaction chamber, means for introducing fuel and air into said reaction chamber for thermal reaction therein, means for proportioning said fuel and air with a large deficiency of air for complete combustion, said reaction chamber having an opening to said heating chamber for the passage of the hot reaction products thereinto, a combustion chamber in heat transfer relation to said reaction chamber, means for withdrawing said reaction products from said heating chamber and introducing them into said combustion chamber, means for supplying air to said combustion chamber for combustion with said reaction products and means for venting said combustion chamber in heat transfer relation to said heating chamber.

2. A furnace for the heating of metal in a non-scaling atmosphere comprising a metal heating chamber, a reaction chamber, means for introducing fuel and air into said reaction chamber for thermal reaction therein, means for proportioning said fuel and air with a large deficiency of air for complete combustion, said reaction chamber having an opening to said heating chamber for the passage of the hot reaction products thereinto, a combustion chamber in heat transfer relationship to said reaction chamber, vent means for withdrawing said products from said heating chamber and introducing them into said combustion chamber and means for supplying air to said combustion chamber for combustion with said reaction products.

3. A furnace constructed in accordance with claim 2 in which said reaction chamber comprises an elongated refractory tube extending through said combustion chamber, said tube having said opening at one end and said means for introducing fuel and air at the opposite end.

4. A furnace constructed in accordance with claim 2, having a common partition of good heat conducting characteristics disposed between said work heating chamber and said combustion chamber.

5. A furnace constructed in accordance with claim 2 in which said means for supplying air to said combustion chamber comprises a nozzle disposed in suction producing relation to said vent means.

6. A furnace constructed in accordance with claim 2, having a second combustion chamber, a common partition of good heat conductivity disposed between said work heating chamber and said second combustion chamber and means for introducing fuel and air in combustible proportions into said second combustion chamber.

7. A furnace constructed in accordance with claim 6 in which the means for supplying fuel to said second combustion chamber comprises an exhaust conduit interconnecting said first mentioned combustion chamber and said second combustion chamber.

8. A furnace constructed in accordance with claim 7 in which the means for introducing air into said second combustion chamber comprises a nozzle disposed in suction producing relation to said exhaust conduit.

9. A furnace constructed in accordance with claim 8 having temperature responsive means for said first mentioned combustion chamber and means controlled thereby for proportioning the air supply to said first mentioned combustion chamber and said second combustion chamber.

10. A furnace constructed in accordance with claim 8 having temperature responsive means for said work heating chamber, means controlled thereby for varying the volume of fuel and air supplied to said reaction chamber and the aggregate volume of air supplied to said first mentioned and second combustion chamber and other means for apportioning said aggregate volume of air between said first mentioned and second combustion chambers.

11. A furnace for the heating of metal comprising a work heating chamber, a combustion chamber, a common impervious partition composed of a material of good heat conductivity disposed between said work heating chamber and said combustion chamber, a reaction chamber disposed in said combustion chamber and having an opening into said work heating chamber, means for supplying a primary mixture of fuel and air to said reaction chamber, said mixture having a large deficiency of air for complete combustion and means for supplying a combustible mixture of fuel and air to said combustion chamber, whereby to heat said reaction chamber to above the normal reaction temperature of said primary mixture.

12. A furnace constructed in accordance with claim 11 having a second combustion chamber disposed above said work heating chamber and separated therefrom by a heat conducting partition, and means for supplying a third mixture of fuel and air to said second combustion chamber.

References Cited in the file of this patent

UNITED STATES PATENTS

| | | |
|---|---|---|
| 2,233,474 | Dreffein | Mar. 4, 1941 |
| 2,275,106 | Hayes | Mar. 3, 1942 |
| 2,587,900 | Bobiette | Mar. 4, 1952 |

OTHER REFERENCES

Metals Handbook, published by the ASM, 1948 edition, page 297.